(12) United States Patent
Gu

(10) Patent No.: US 7,340,732 B2
(45) Date of Patent: Mar. 4, 2008

(54) UPDATING PROFILE FREQUENCY FOR PROCEDURE INLINING

(75) Inventor: Junjie Gu, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 509 days.

(21) Appl. No.: 10/723,877

(22) Filed: Nov. 26, 2003

(65) Prior Publication Data
US 2005/0262491 A1   Nov. 24, 2005

(51) Int. Cl.
*G06F 9/45* (2006.01)

(52) U.S. Cl. .................... 717/150; 717/140

(58) Field of Classification Search .............. 717/150
See application file for complete search history.

(56) References Cited

U.S. PATENT DOCUMENTS

| | | | |
|---|---|---|---|
| 5,276,881 A | 1/1994 | Chan et al. ............... 395/700 |
| 5,280,613 A | 1/1994 | Chan et al. ............... 395/700 |
| 5,606,697 A | 2/1997 | Ono ........................ 395/707 |
| 5,659,754 A | 8/1997 | Grove et al. .............. 395/709 |
| 5,740,443 A * | 4/1998 | Carini ...................... 717/133 |
| 5,920,723 A * | 7/1999 | Peyton et al. ............. 717/157 |
| 6,059,839 A | 5/2000 | Dehnert et al. ............ 717/9 |
| 6,072,951 A | 6/2000 | Donovan et al. .......... 395/709 |
| 6,078,744 A | 6/2000 | Wolczko et al. .......... 395/705 |
| 6,106,574 A | 8/2000 | Baisley et al. ............ 717/5 |
| 6,161,217 A | 12/2000 | Detlefs et al. ............ 717/5 |
| 6,195,793 B1 * | 2/2001 | Schmidt .................. 717/151 |
| 6,223,340 B1 | 4/2001 | Detlefs .................... 717/5 |
| 6,249,911 B1 | 6/2001 | Arimilli et al. ........... 717/9 |
| 6,253,373 B1 | 6/2001 | Peri ......................... 717/9 |
| 6,367,071 B1 | 4/2002 | Cao et al. ................. 717/9 |
| 6,971,091 B1 * | 11/2005 | Arnold et al. ............ 717/145 |

OTHER PUBLICATIONS

Arnold, Matthew, et al., "A Comparative Study of Static and Profile-Based Heuristics for Inlining," ACM, pp. 52-64. Jan. 2000.
Ball, Thomas, et al., "Optimally Profiling and Tracing Programs, ACM Transactions on Programming Languages and Systems," vol. 16, No. 4, Jul. 1994, 1319-1360.
Chang, Pohua P., et al., "Using Profile Information to Assist Classic Code Optimizations," Software—Practice and Experience, vol. 21(12), 1301-1321, Dec. 1991.

\* cited by examiner

*Primary Examiner*—Wei Y. Zhen
*Assistant Examiner*—Phillip H Nguyen
(74) *Attorney, Agent, or Firm*—Dorsey & Whitney LLP

(57) ABSTRACT

A method and apparatus for frequency-updating for procedure inlining. The frequency-updating scheme assumes the call graph of a program has no cycles. It keeps the frequency for each procedure as accurate as that before inlining. Using the present invention, the runtime performance of a source program by a compiler is improved. A source program is analyzed to generate a call graph of the source program, wherein each of the procedures has a first known execution frequency. The call graph is used in conjunction with inlining plans by an inlining algorithm to generate an inlined version of the source program wherein selected call sites have been inlines. An updated execution frequency is generated for each of the procedures and the updated execution frequency for each of the procedures is used to generate optimized executable code for the source program.

12 Claims, 11 Drawing Sheets

OPTIMIZING COMPILER

Fig 3. Compilation Process of Profile-Directed Optimizations
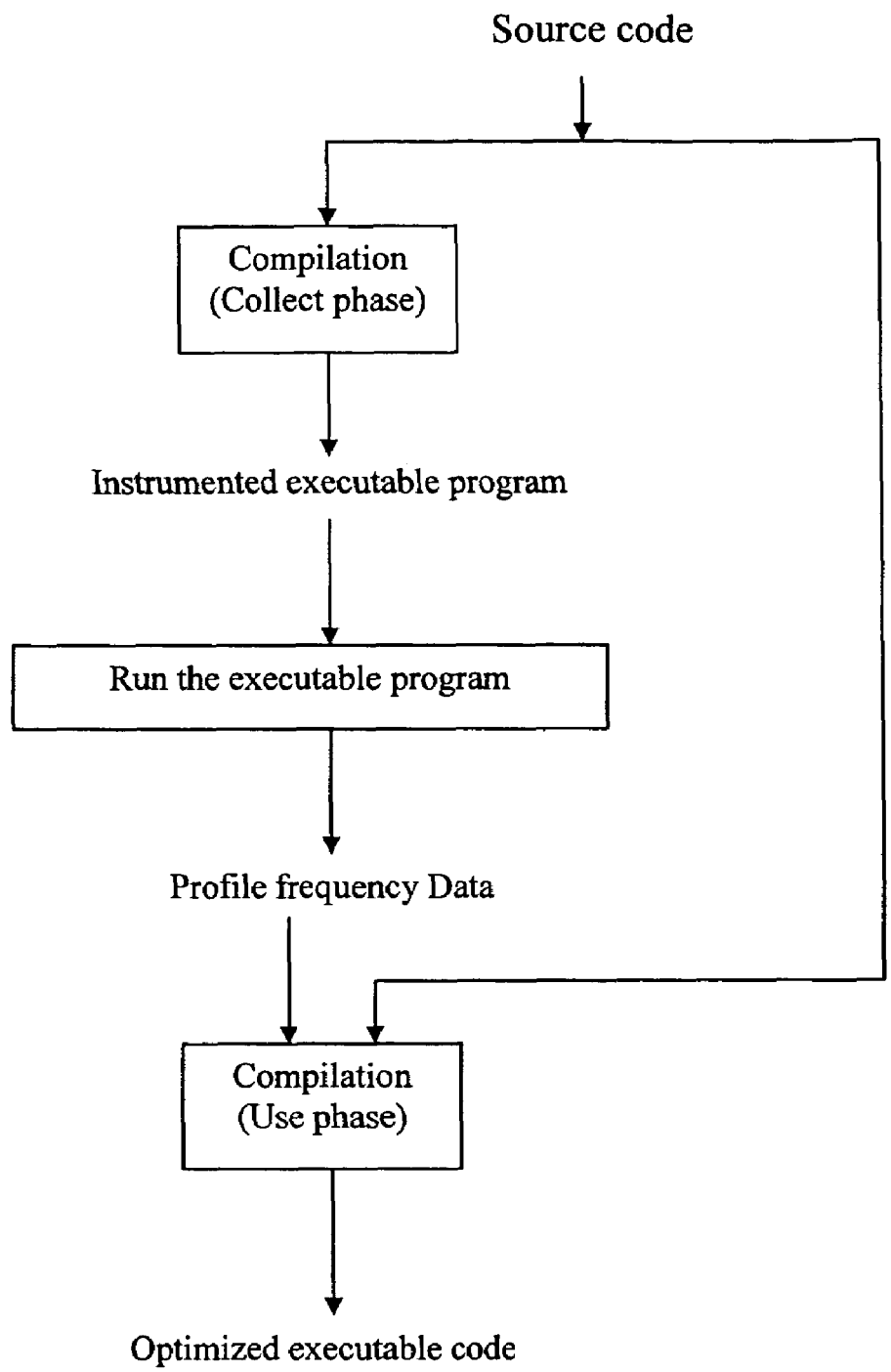

Fig 4. Compiler Components: collect phase and use phase (prior art)
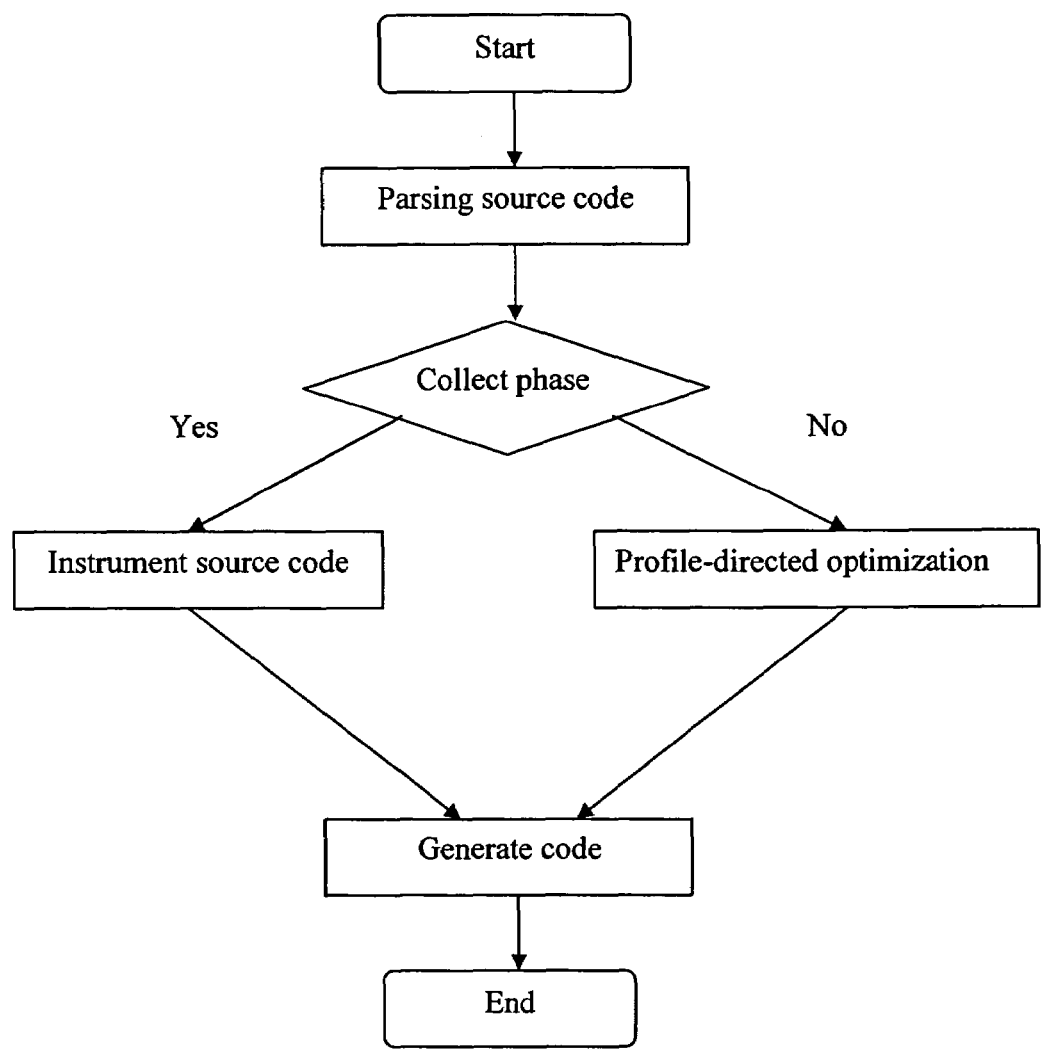

Fig. 5 Frequency change before and after inlining
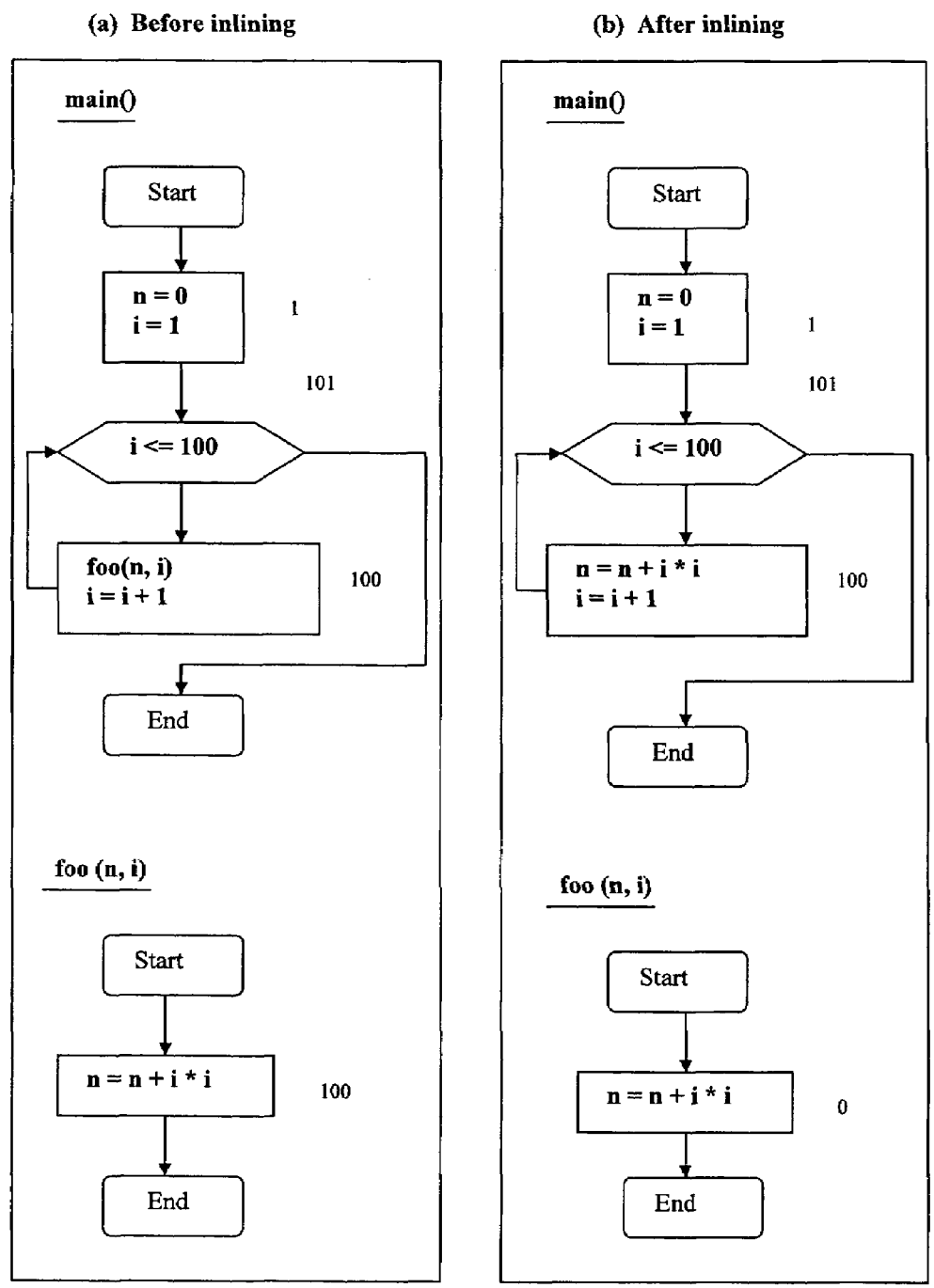

Fig 6.    Profile-Directed Optimizations (PDO) (prior art)
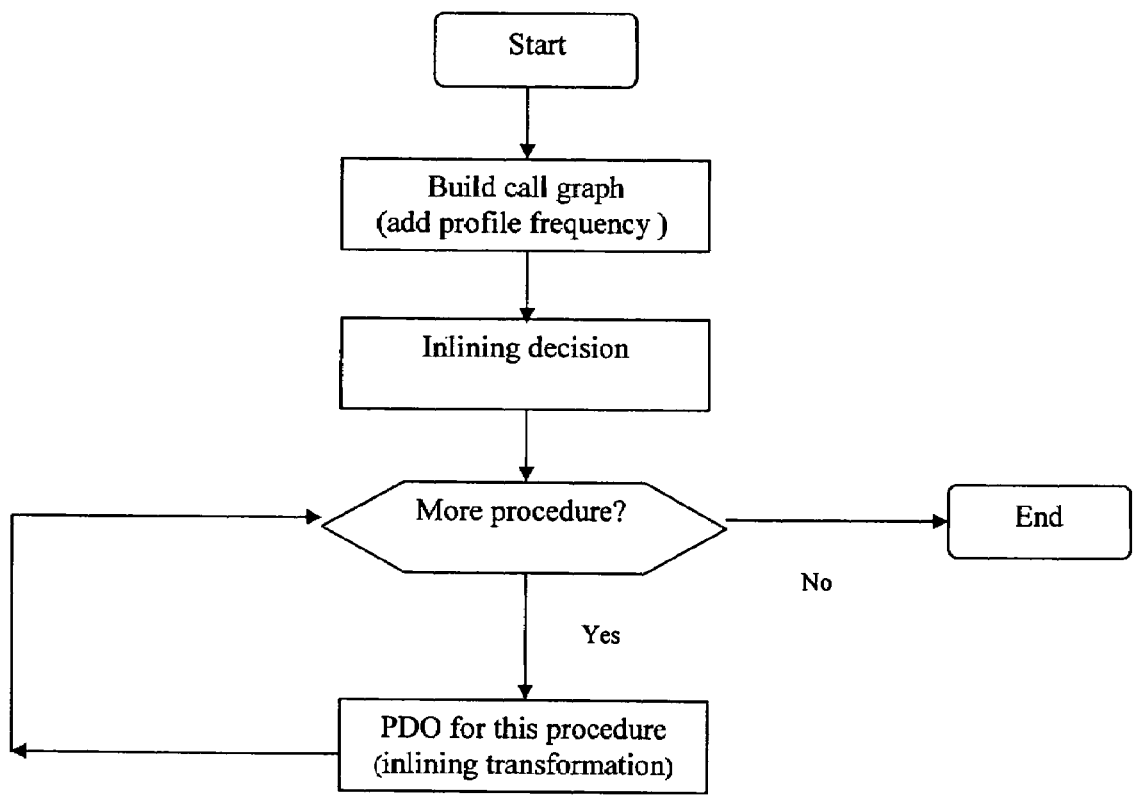

Fig 7. Example of Call graph and IP
Fig 7(a) Original Code
```
  foo() {
c1:   bar(1);
c2:   bar(3);
  }
  bar(n) {
c3:   cat(n);
c4:   cat(n+1);
  }
  cat (m) {
     <body of cat(m)>
  }
```
Fig 7(b) After Inlining
```
Foo() {
   <body of cat(1)>
   <body of cat(2)>
   c3_2: cat(3)
   <body of cat(4)>
}
bar(n) {
   cat(n);
   cat(n+1);
}
cat (m) {
   <body of cat(m)>
}
```
Fig 7(c) Call Graph
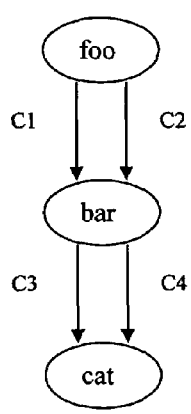
Fig 7(d) IP(foo)
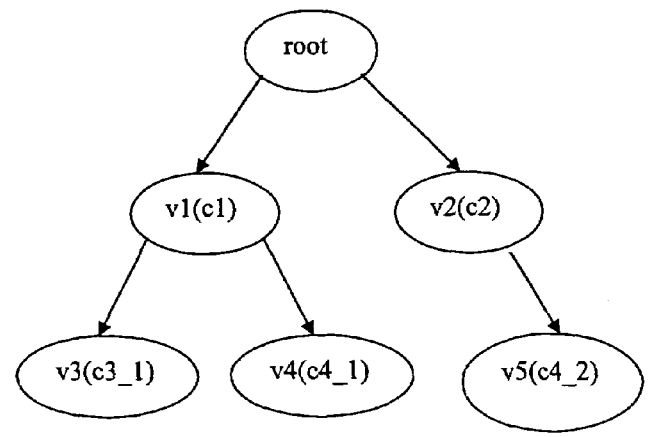

Fig. 8 Inlining Original Procedures

Fig. 8(a) Original Procedures

Fig. 8(a) Original Procedures

```
main () {            foo() {            bar () {
  foo();               bar();
}                    }                  }
```

Fig. 8(b) Inlining original bar into foo

```
main () {            foo() {            bar () {
  foo();
}                    }                  }
```

Fig. 8(c) Inlining original foo into main

```
main () {            foo() {            bar () {
  bar();
}                    }                  }
```

FIG. 9 Updating Frequency

```
proc {
    e;    freq(e)
}
```

Fig 9(a)

```
callee(e) { freq(e)↓
    e1;   a1 ↓
}
```

Fig 9(b)

```
callee(e1) { a1 ↑
    e2;   a2 ↑
}
```

Fig 9(c)

```
Callee(e2) { a2 ↓
}
```

Fig 9(d)

Fig. 10 Example of Applying the Algorithm

Fig. 10(a) Original procedures (frequency is number after colon)

```
proc() { :1           foo() { :1                  bar() { :101        cat() { :101
  e1: foo() : 1         for (i=0; i<100;i++)        e4: cat() : 101      }
  e2: bar() : 1           e3:  bar() : 100        }
}                     }
```

Fig. 10(b) Inlining e3 into foo

```
proc() { :1           foo() { :1                  bar() { :1          cat() { :101
  e1: foo() : 1         for (i=0; i<100;i++)        e4: cat() : 1        }
  e2: bar () : 1          e5: cat() : 100         }
}                     }
```

(IP(proc))    (IP(foo))    (IP(bar))    (IP(cat))
                 |
                 v
                (e3)

Fig. 10(c) Inlining e4 into bar
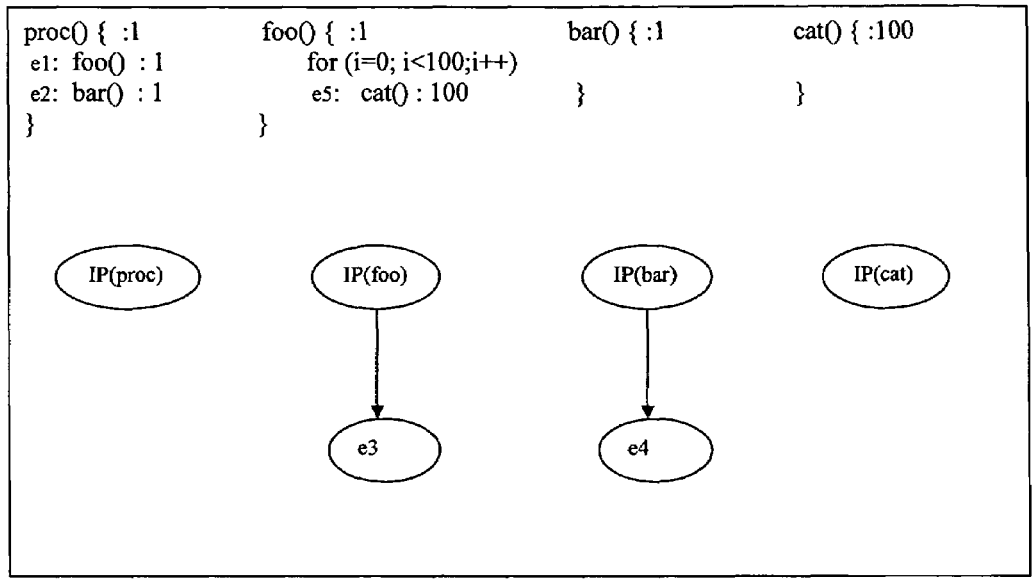
Fig. 10(d) Inlining e1 into proc
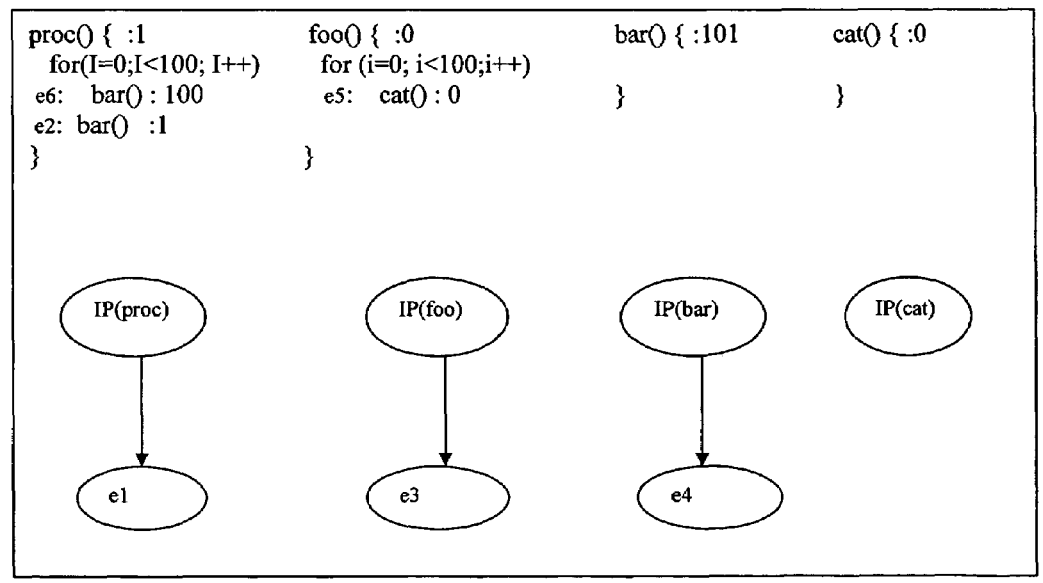

UPDATING PROFILE FREQUENCY FOR PROCEDURE INLINING

FIELD OF THE INVENTION

The present invention relates generally to digital computers. More particularly, the present invention relates to profile-directed optimization of compilers used in digital computers.

BACKGROUND OF THE INVENTION

Improving performance of a computer program, i.e., shortening its running time, has been one of the main objectives in the computer research since the inception of the computer. The use of compilers has proven to be one of the most effective ways to improve computer performance. Over the past several decades, many compilation techniques have been developed for performing this task. Examples of compilers for optimizing computational performance are described in U.S. Pat. No. 6,078,744 issued to Wolczko, et al. and U.S. Pat. No. 5,659,754 issued to Grove, et al. Both of the aforementioned U.S. patents are incorporated herein by reference for all purposes.

A compiler is a software program that translates source code into the machine code that can be executed on a computer. There are many ways to generate using a compiler. Some compilations result in faster code, while other compilations result in slower code. Compiler optimizations are techniques to generate faster code. Some optimizations, such as "inlining" of procedure calls and "hoisting" of loop invariant code, need to be applied on frequently executed code segments. However, if those optimizations are applied on infrequent executed code segments, performance can actually be degraded. Furthermore, applying optimizations also increases compiling time, which decreases productivity. Thus, a compiler should avoid unnecessary optimizations, such as those that apply to infrequently executed code segments.

A "profile" is a well-known technique that tells a compiler which code segments are frequently executed and which are not. In the field of compilers, the optimizations based on profiles are known as profile-directed optimizations (PDO) or feedback-directed optimizations (FDO). Further discussion of these techniques can be found in: 1) Pohua P. Chang, Scott A. Mahlke, and Wen-Mei W. Hwu, "Using Profile Information to Assist Classic Code Optimizations, Software—Practice and Experience," Vol. 21(12), 1301-1321, December 1991; and 2) Thomas Ball, James R. Larus, "Optimally Profiling and Tracing Programs, ACM Transactions on Programming Languages and Systems," Vol. 16, No. 4, July 1994, 1319-1360. Each of the aforementioned references is hereby incorporated by reference for all purposes.

There are many PDO techniques, including "procedure inlining" and "code reordering." In general, procedure inlining replaces a call statement (also referred to as "call site" or simply "call") with the corresponding called procedure, usually referred to as the "callee." Procedure inlining offers the advantage of eliminating call overhead and providing better opportunities for optimizations. The disadvantage of inlining is that it may increase compiling time and code size. Inlining also may degrade runtime performance if infrequently executed calls are inlined, or if inlining causes more register spills as a result of high register pressure.

Profile-directed procedure inlining selects calls to inline based on their execution frequencies. The goal is to select frequently executed calls and avoid infrequently executed calls. Profile-directed reordering of code segments based on their frequencies is also widely used. In this method, the most frequently executed segments are grouped together to achieve better locality and thus improve performance.

Because PDOs rely on frequency to make optimization decisions, the accuracy of frequency is essential. Some PDOs change frequency and, therefore, if the frequency is not updated after a frequency changing optimization is performed, other profile-directed optimizations carried out afterwards will rely on inaccurate frequency. This can result in unwanted optimizations that degrade performance. Among these PDOs, procedure inlining is a technique that changes frequency significantly. It is essential, therefore, that a procedure inlining optimization is accompanied by an accurate frequency updating technique.

SUMMARY OF INVENTION

The present invention provides a frequency-updating scheme for procedure inlining. The frequency-updating scheme assumes the call graph of a program has no cycles. It keeps the frequency for each procedure as accurate as that before inlining. In one embodiment of the present invention, a computer controlled method for improving runtime performance of a source program by a compiler comprises: (a) analyzing said source program comprising procedures to generate a call graph of said source program, wherein each of said procedures has a first known execution frequency; (b) using said call graph in conjunction with inlining plans by an inlining algorithm to generate an inlined version of said source program wherein selected call sites have been inlined, c) generating an updated execution frequency for each of said procedures; (d) using said updated execution frequency for each of said procedures to generate optimized executable code for said source program. In various embodiments of the invention, heuristics can be used to calculate cost/benefit ratios for calls in the procedures of the source program to generate a ranking of the call sites and to select calls in the subroutines for inlining. The selected calls are inlined until a predetermined resource limit has been reached. An updated execution frequency is computed each time any of the call sites is inlined. In an embodiment of the invention, the updated execution frequency of the procedures is determined by proportional adjustment, wherein the ratio between a procedure's frequency and its statement frequency remains unchanged.

BRIEF DESCRIPTION OF DRAWINGS

FIG. 3 is an illustration of a process for profile-directed optimizations.

FIG. 4 is an illustration of compiler components for the collect phase and the use phase of an optimization process.

FIG. 5A is an illustration of frequency change in a profile-directed optimization before inlining.

FIG. 5B is an illustration of frequency change in a profile-directed optimization after inlining.

FIG. 6 is an illustration of the processing steps in a profile-directed optimization.

FIG. 7A is an illustration of a program prior to inlining.

FIG. 7B is an illustration of the program of FIG. 7A after inlining.

FIG. 7C is an illustration of a call graph generated from the program illustrated in FIG. 7A.

FIG. 7D is an illustration of the inlining plan of the program illustrated in FIG. 7A.

FIG. 8A is an illustration of source code prior to application of inlining procedures.

FIG. 8B is an illustration of the inlining of a procedure of the source code.

FIG. 8C is an illustration of a subsequent inlining of a procedure of the source code.

FIGS. 9A-D illustrate procedures for frequency updating in the inlining process of the present invention.

FIGS. 10A-D illustrate procedures for applying the updating algorithm of the inlining process of the present invention.

DETAILED DESCRIPTION

Figure 1:
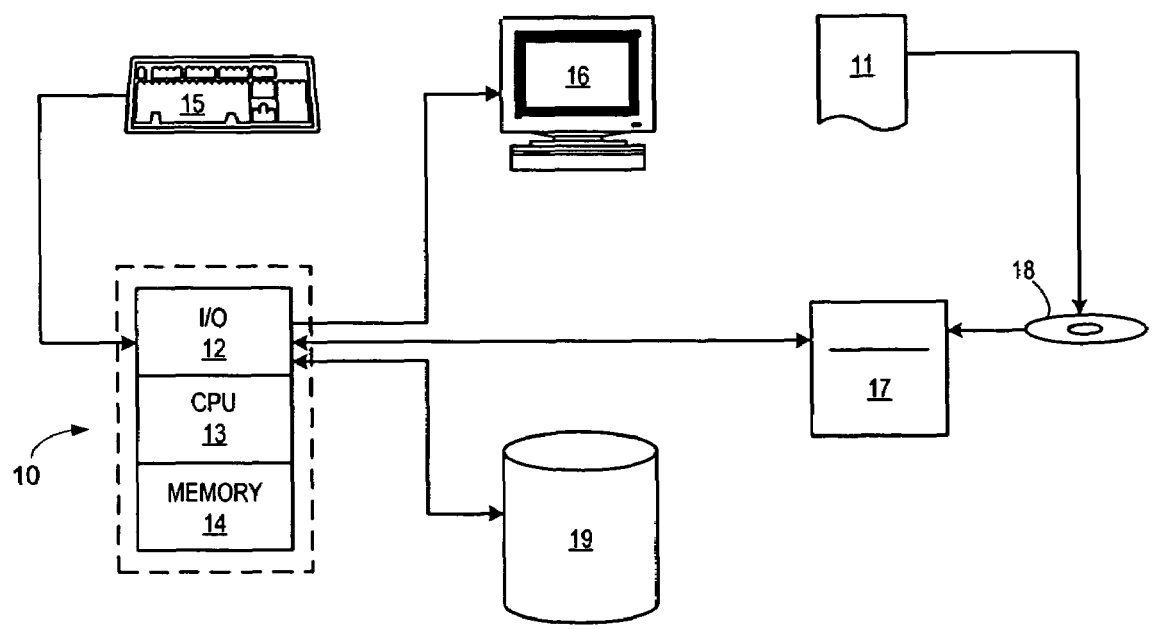
FIG. 1 illustrates a portion of a computer, including a CPU and conventional memory in which the present invention may be embodied.

The environment in which the present invention is used encompasses the general distributed computing system, wherein general purpose computers, workstations, or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 10 is shown, having an input/output ("I/O") section 12, a central processing unit ("CPU") 13, and a memory section 14. The I/O section 12 is connected to a keyboard 15, a display unit 16, a disk storage unit 19, and a CD-ROM drive unit 17. The CD-ROM unit 17 can read a CD-ROM medium 18 which typically contains programs 11 and data.

Figure 2:
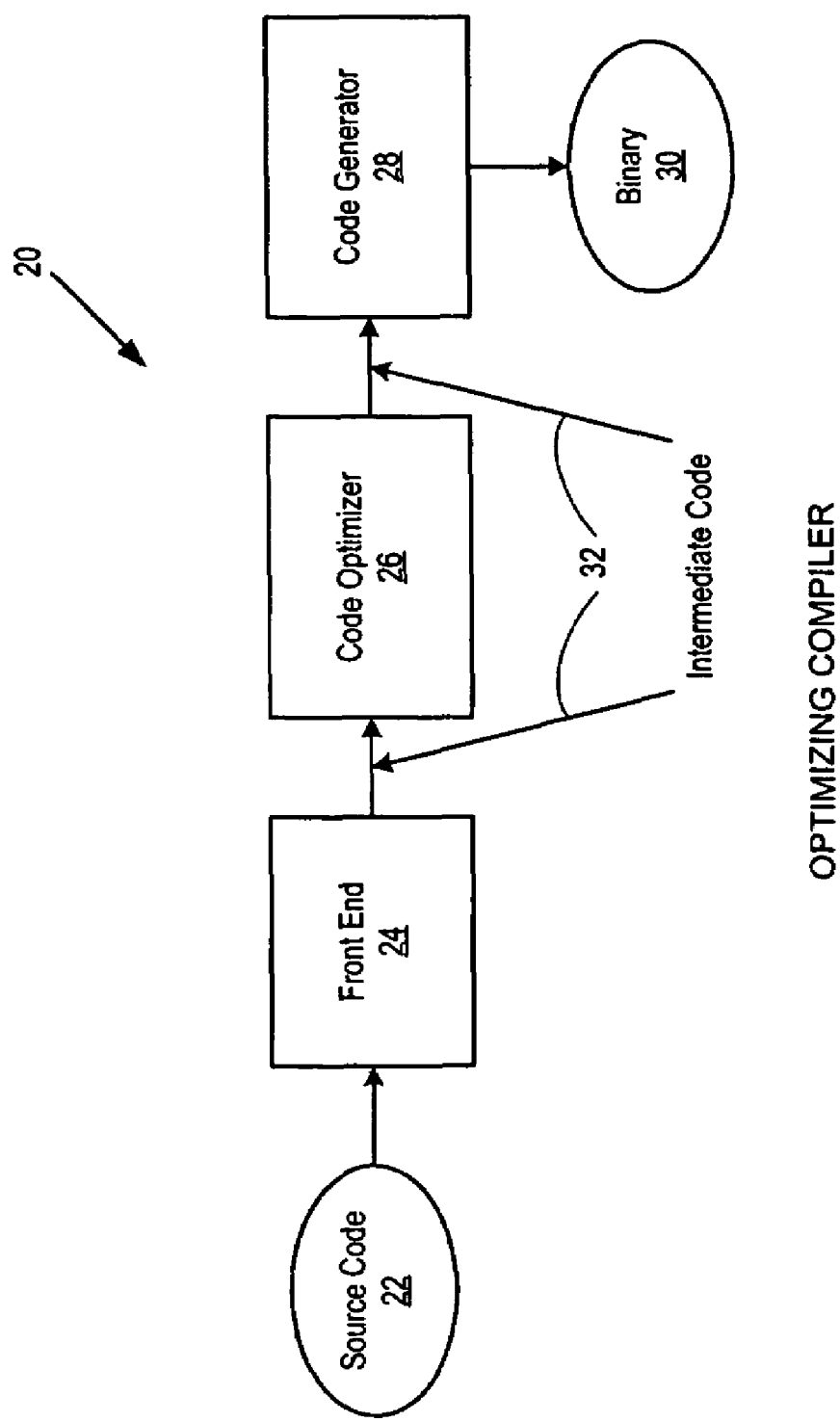
FIG. 2 illustrates a typical compiler comprising a code optimizer.

FIG. 2 illustrates a typical optimizing compiler 20, comprising a front end compiler 24, a code optimizer 26, and a back end code generator 28. The front end 24 of a compiler takes as input a program written in a source language 22 and performs various lexical, syntactical and semantic analysis on this language outputting an intermediate set of code 32 representing the target program. This intermediate code 32 is used as input to the code optimizer 26 module which attempts to improve the intermediate code so that faster-running binary code 30 will result. The method and apparatus of the present invention offers improved optimization by providing improved updating of profile frequency for procedure inlining.

The PDO of the present invention has three steps as shown in FIG. 3. The first step is the collect-phase compilation, which generates the instrumented code. The collect-phase compilation usually does not include optimizations. The second step runs the instrumented code; and as a result of running the code, the profile frequency data is generated. The frequency data tells which code segments are frequently executed and which are not.

There are several profiling techniques, such as edge profiling, basic block profiling, path profiling, etc. In the present invention, it is assumed that either edge or block profiling is used, although the principle of invention does not restrict itself to these two profiling techniques. As long as the frequency of each block is known (a procedure's frequency is the same as the frequency of its entry block), the invention can be applied. The third step is the use-phase compilation, which compiles the same source code again with the profile data to guide optimizations. The use-phase compilation generates optimized code.

The compiler that supports PDO has two passes internally: collect pass and use pass, shown in FIG. 4. After parsing the source code, the compiler selects either collect pass or use pass. If the collect pass is selected, it conducts instrumentation; otherwise it implements PDO. Users choose either the "collect" or "use" phase by directing the compiler which pass to follow, usually by an option to the compiler's command line. Finally, the optimized code is generated.

Because PDOs rely on frequency to make optimization decision, the accuracy of frequency is essential. Some PDOs change frequency. If frequency is not updated after a frequency changing optimization is performed, other profile-directed optimizations carried out afterwards will rely on inaccurate frequency, which can result in unwanted optimizations that degrade performance. Among these PDOs, procedure inlining is one that changes frequency significantly. FIGS. 5A-B illustrate the frequency change in a profile-directed optimization before and after inlining. The program has two procedures: main and foo. FIG. 5A shows the flowcharts before inlining. The frequency of each basic block is shown next to each block. Frequencies for start and end blocks can be deduced and so are not given in the figure. In this program, the procedure main invokes foo 100 times. FIG. 5B shows the flowcharts after inlining. After inlining foo, the frequency of foo changes from 100 to 0. Therefore, profile-directed optimizer can avoid doing any optimizations on foo because the procedure foo is no longer used.

The present invention is related to inlining scheme. In the following description, the inlining scheme is presented first, and then a detailed description of the invention with examples is given.

Overview of Interprocedural Inlining

The PDOs can be combined with "interprocedural analysis" ("IPA") which performs analysis across procedure boundaries. Compilers using IPA techniques typically build a call graph first and then conduct IPA based on the call graph. Although individual implementation may vary, FIG. 6 illustrates a typical IPA compiler, in which the call graph is built first. The call graph represents the calling relationship between procedures. As will be understood by those of skill in the art, in the call graph, each node represents a procedure and each edge, from caller to callee, represents a call statement. The compiler generally parses one procedure at a time. A node and its edges are built into the call graph each time a procedure is parsed. At the same time, information about the procedure is also saved in the call graph. Such information can include the size of the procedure, the frequencies of the procedure and its calls, actual parameters of calls, etc. These types of information can be used subsequently in interprocedural analysis such as IPA-based inlining. While there are many types of interprocedural analysis, FIG. 6 only illustrates the IPA-based inlining decision, which is carried out based on the information saved in the call graph. The actual inlining transformation occurs when each procedure is optimized and other PDOs are applied. After optimizations are completed, the code is generated. This process continues until all procedures are compiled.

The IPA-based inlining comprises two parts: 1) inlining decision; and 2) inlining transformation. The inlining decision determines which calls should be inlined and records such decision. The inlining transformation involves actual code transformation, i.e., replacing call sites with called procedures. The inlining decision, a key to IPA-based inlining, can be implemented in several ways. For purposes of discussion, a generic IPA-based inlining technique will be described in this invention to illustrate the context in which frequency updating is conducted.

The call graph and the inlining plan are fundamental to the inlining technique discussed hereinbelow.

Call Graph

Let G(N,E) represent a call graph for a given program, where N is the set of nodes and E is the set of directed edges. Each procedure in a program has a unique node in N and each call statement in the program has an unique edge in E. Given an e in E, let caller(e) and callee(e) denote e's caller and callee respectively; obviously, caller(e) and callee(e) are in N. Because E represents all call statements, G is also known as an invocation graph.

The IPA-based inlining separates the inlining decision from the inlining transformation. Because the inlining decision is based on the call graph, it has global information about the program and thus can make better choices. However, the inlining decision must be saved so that the inlining transformation can finish transformation later based on the saved information. To represent which call is inlined into which procedure and through which callers, the Inlining Plan (IP) will be used. This technique is described in: Matthew Arnold, Stephen Fink, Vivek Sarkar, and P. F. Sweeney, "A Comparative Study of Static and Profile-based heuristics for Inlining," 52-64, ACM SIGPLAN DYNAMO'00, January 2000, which has been incorporated herein by reference for all purposes.

Inlining Plan (IP)

An inlining plan for a given procedure n, denoted by IP(n), is a tree. Each non-root node in the IP corresponds to a call statement (or an instance of a call statement). An example discussed hereinbelow will be inlined into n. Its root node is a dummy node, i.e., no call statement corresponds to the root node. For a non-root node v, v's corresponding call statement is denoted by call(v). Given two nodes v1 and v2. Let c1 be call(v1) and c2 be call(v2). If both the following conditions hold, then node v2 will be the child of node v1 in IP(n): (1) callee(c1) is the same as caller(c2), and (2) c2 is inlined into n via c1, that is, c1 is inlined into n first and then c2 is inlined into n.

FIGS. 7A-D illustrates an example of a call graph and inlining plan. FIG. 7A shows the original program. There are four call statements, i.e., c1, c2, c3, and c4. Both c1 and c2 calls the same procedure bar, and both c3 and c4 call the same procedure cat. Its call graph is given in FIG. 7C, in which each call statement has its call edge. Suppose both c1 and c2 are inlined into foo. The foo now has four call statements to cat. Further assume that two calls to cat from the inlining of c1 are inlined into foo and only c4 from the inlining of c2 is inlined into foo. The inlining plan for foo is given in FIG. 7B. In IP(foo), v1 and v2 correspond to c1 and c2, respectively. The corresponding call for each IP node is shown in parentheses in FIG. 7D. After c1 is inlined into foo, new instances of c3 and c4 are created in foo. These are denoted by c3_1 and c4_1, respectively. The node v3 and v4 denote that these two new instances get inlined into foo. Furthermore, after c2 is inlined into foo, two more new instances of c3 and c4 are also created in foo. These are denoted by c3_2 and c4_2, respectively. Because the instance c3_2 is not inlined into foo, there is no node for this instance in the IP tree. The node v5 denotes the fact that the instance c4_2 gets inlined into foo. Both v4 and v5 are associated with the same call c4 in the original program, but represent different instances of c4. The v5 is not a child of v1 because it is not inlined via c1 (applying the second condition), and similarly, v4 is not a child of v2 either.

For discussion purposes, a definition of the inlining procedure and the inlined procedure are as follows: given a call e, its inlining procedure is one into which e is inlined. The inlining procedure for e is either its direct caller or indirect callers. The inlined procedure of e is e's callee.

A Generic Inlining Algorithm (GIA)

The GIA will always inline the original procedures. For example, given the source code shown in FIG. 8A, FIG. 8B shows the inlining of the original bar into foo; FIG. 8C shows the inlining of the original foo into main, not foo given in FIG. 8B. Inlining the original procedures is more flexible than inlining the non-original procedures (that is, the procedures that have inlined other procedures). This is because inlining a non-original procedures means that whatever have been inlined into it must also be inlined, and thus it loses the freedom for not inlining those procedures. Clearly, inlining original procedures has a complete control on which calls to inline, and so it is a better approach.

The GIA operates as follows: The GIA first calculates the cost/benefit ratio for all calls. Based on those ratios, the GIA selects one call at a time until either all calls have been selected or a predetermined resource budget has been reached. At the time a call has been selected for inlining, the IP tree of its inlining procedure will be updated to reflect this fact. At the same time, the frequency is updated accordingly.

For purposes of discussion, assume that for each call e, its caller, callee, and frequency are represented by caller(e), callee(e), and freq(e), respectively. In the GIA algorithm shown below, a list is used to denote all inlinable calls.

```
GIA( ) {
    // Input: a call graph G(N,E)
    // Output: IPs for each n in N
    inlineSetup( );
    updatingSetup( );
    inlinableCalls = getAllInlinableCalls( );
    while ( inlinableCalls is not empty ) {
        e = selectBestCall (inlinableCalls);
        if ( satisfyResourceBudget(e) ) {
            updatingResourceBudget(e);
            updatingInliningPlan(e);
            updatingFrequency (freq(e), callee(e));
            // Create a new call for each call in callee(e), and
            // add it into inlinableCalls
```

```
            for (each call c in callee(e) ) {
                c1 = createNewCall (c);
                caller(c1) = callee(c);          // use c's callee
                caller(c1) = caller (e);         // use e's caller, not c's
                freq(c1) = freq(e) * (orig_freq(c)  // orig_freq(callee(e)) );
                inlinableCalls += c1;
            }
        }
        inlinableCalls -= e;
    }
}
```

The GIA takes as input a call graph and generates as an output the inlining plans for all nodes. First, the GIA performs initializations such as setting up data structures and resource budgets needed for the GIA to run. The resource budgets are essential because inlining too much can increase compiling time significantly and may also degrade the performance, as explained hereinabove. Using the resource budget is a typical way to avoid over-inlining. The GIA starts by collecting all inlinable calls and iterates over those calls until all of them are processed. In each iteration, the GIA selects the best call at that time and checks to see if the selected call can actually be inlined. If so, it saves the information in the inlining plan and also updates the frequency. For such the to-be-inlined call, all calls in its callee are now present in its caller as well as the result of inlining it. These new calls in its caller are considered as instances of the calls in its callee. Since there are no call edges for these new calls, the GIA will create new calls, which is the function of createNewCall(c) does. These new calls are then added in the list inlinableCalls. The GIA does not change the call graph to reflect this change because the inlining transformation has not been done yet at this point. The orig_req ( ) used for calculating freq( ) is the original profile frequency as input to the compiler and will be discussed further hereinbelow. Finally, the current selected call, regardless of whether is to-be-inlined, will be removed from the list inlinableCalls. Because of the limitation imposed by the resource budget, the GIA cannot inline infinitely and must terminate.

In the GIA, updating frequency is performed immediately after updating IP when a call is selected for inlining. All procedures except updatingFrequency and updatingSetup will not be described further because their functionality is well understood by those of skill in the art and is not related to the essential features of the present invention.

Updating Frequency Algorithm

Given the original frequencies, the updating algorithm re-adjusts the frequencies of procedures and their call statements whenever inlining occurs. The new frequencies will reflect the effect of inlining with respect to the assumption of "proportional adjustment."

The "proportional adjustment" refers to updating frequency proportionally, which means that for a procedure, the ratio between a procedure's frequency and its statement's frequency remains the same all the time. If the procedure's frequency is reduced, its calls' frequency should be reduced proportionally. For example, assume that procedure foo's frequency is 100, one of its calls is 50, and another is 100. If foo's frequency is reduced to 50, one call with frequency 50 will be reduced to 25 so that the ratio between foo and the call remains to be 2 (100/50=50/25). Similarly, the other call with frequency 100 will be reduced to 50.

The term orig_freq(x) denotes the original frequency of x, where x is either a function or a call statement. The original frequency is known and given as input to the algorithm. The term freq(x) represents the current frequency as the frequency changes whenever inlining occurs. For discussion purposes, it can also be assumed that the initial value of freq(x) is orig_freq(x), which means that freq(x) represents the current frequency when there is nothing to be inlined. Based on this notion, the problem can be formally described as follows.

Given G(N,E), an IP tree for each n in N, and orig_freq(x) for every x in N and E. For procedure n in N, let e be a call that is selected to be inlined into n. What is the new freq(x) after e is inlined, for every x in N and E?

First, it can be shown that it is only necessary to calculate freq(n) for each n in N and it is not necessary to keep freq(e) for each e in E. As discussed previously, the ratios between a procedure's frequency and its statements are kept unchanged no matter how frequencies are changed. Thus, given freq(n) for a procedure n, freq(e) for each e within n can be calculated as:

$$freq(e)=freq(n)*(orig\_freq(e)/orig\_freq(n))$$

Although calculating freq(n) for n in N is enough, the updating algorithm still calculate freq(e) for e in E for convenience.

1. Initialization

The initialization procedure is invoked by the GIA just before performing the inlining decision.

```
updatingSetup( ) {
    For (each n in N) {
        freq(n) = orig_freq(n)
        IP(n) = <dummy_root_node>
    }
    For (each e in E) {
        freq(e) = orig_freq(e)
    }
}
```

2. The Updating Algorithm

```
// Reduce frequency of procedure proc by freq_dec
// A positive freq_dec means to reduce proc's frequency.
// A negative freq_dec means to increase proc's frequency.
updatingFrequency(freq_dec, proc) {
    curr_freq = freq(proc); // keep the current value for later use
    // proc's frequency should be REDUCED by freq_dec
    freq(proc) -= freq_dec;
    // For calls that are not inlined into proc (i.e. not in IP(proc),
    //   just do updating.
```

-continued

```
// For calls that have been selected for inlining into proc (i.e.,
   in IP(proc)),
// do updating and invoke updatingFrequency( ) recursively.
For (each call e that is not in IP(proc)) {
    ratio = freq(e) / curr_freq;
    freq(e) = freq(proc) * ratio
}
For (each v in IP(proc)) {
    e = call (v); // get the corresponding call for v
    ratio = freq(e) /curr_freq;
    change = freq(e);
    freq(e) = freq(proc) * ratio
    change -= freq(e);
    updatingFrequency(-change, callee(e));
}
}
```

The initialization sets up initial frequency for each procedure and each call edge. For convenience, it also creates a dummy root node for each procedure's IP. The initialization is done before the inlining algorithm is applied as discussed above in the description of the GIA.

FIGS. 9A-C illustrate four procedures relating to the updating procedures. The term updatingFrequency is illustrated in FIG. 9. Assume that e1 and e2 have been selected for inlining into callee(e) and callee(e1), respectively. Now, the GIA just selected e for inlining into proc. Since e is going to be inlined into proc as shown in FIG. 9A, it is necessary to deduct freq(e) from that of callee(e). FIG. 9B shows the decrease by a downward arrow. Since callee(e)'s frequency is reduced, the frequencies of its calls should be reduced too. Because e1 is one of its call and has been inlined into callee(e) before, the frequency for callee(e1) was updated at that time and freq(e1) was deducted from that of callee(e1). Now,freq(e1) is reduced due to e's inlining into proc. As a result, the previous deduction from callee(e1) was too much and needs to be adjusted. The amount that needs to be added back is that of freq(e1)'s change. Let a1 be the amount which freq(e1) should be deducted by. Then callee(e1) should add a1 to its frequency. FIG. 9C shows this fact by an upward arrow. Now, after callee(e1)'s frequency is increased, all its calls' frequencies should be increased accordingly. Because e2 was inlined into callee(e1) before, callee(e2)'s frequency was updated at that time. If e2's frequency is increased by a2, callee(e2)'s frequency should be decreased by a2 accordingly as shown in FIG. 9D. Basically, FIG. 9D repeats FIG. 9B and updating proceeds as a sequence of FIG. 9B, FIG. 9C, FIG. 9B, FIG. 9C . . . . This process of decrease and increase continues until no procedure needs to be updated. Because this approach assumes that no procedures are in cycles and therefore no recursive inlining would happen, the algorithm will not iterate infinitely and must terminate.

Example of Applying the Algorithm

FIG. 10 shows an example how the updating algorithm is applied. FIG. 10A shows the original procedures whose frequencies are given after the colons. Assume that the GIA successively selects e3, e4, and e1 for inlining. For convenience, N, E, orig_freq, and freq are denoted by vectors. The frequency vectors for N and E are prefixed with N_and E_, respectively. The ith element in both N_orig_freq (E_orig_freq) and N_req (E_freq) denotes the frequency value for the ith element in N (E).

Initialization

N={proc, foo, bar, cat}
E={e1, e2, e3, e4 }
N_orig_freq=N_freq={1, 1,101, 101}
E_orig_freq=E_freq={1, 1,100, 101}

Details of the GIA and updatingFrequency

GIA selects e3 for inlining into foo. FIG. 10B shows the source code and IP trees after e3 is selected for inlining. The GIA invokes updatingFrequency as follows:

updatingFrequency(100, bar)
freq(bar)=101−100=1
freq(e4)=1*101/101=1

The GIA adds another edge e5 for the instance of e4 as bar is inlined into foo and sets its value to 100, that is, freq(e5)= 100. And caller(e5) is foo.

Now, after inlining, the result is:
N_freq={1, 1, 1, 101}
E_freq={1, 1, 100, 1, 100}
GIA selects e4 for inlining into bar.

FIG. 10C shows the source code and IP trees after e4 is selected for inlining. The GIA invokes updatingFrequency as follows:

updatingFrequency(1, cat)
freq(cat)=100
Now, after inlining, the result is:
N_freq={1, 1, 1, 100}
E_freq={1, 1, 100, 1, 100}
GIA selects e1 for inlining into proc.

FIG. 10D shows the source code and IP trees after e1 is selected for inlining. Note that it is the foo in FIG. 10A that gets inlined, not the foo in FIG. 10D. This has been explained in the GIA section. The GIA invokes updatingFrequency as follows:

```
updatingFrequency(1,foo)
    freq(foo) = 0
    freq(e5) = 0                          // not in IP(foo)
    freq(e3) = 0, change = 100            // in IP(foo)
    updatingFrequency(-100, bar)
        freq(bar) = 1 - (-100) = 101
        freq(e4) = 101, change = -100 //in IP(bar)
        updatingFrequency(100, cat)
            freq(cat) = 100 - 100 = 0
```

Also, the GIA will add another edge e6 for the instance of e3 as the result of inlining foo into proc. And e6's frequency is 100 and its caller is proc.

The result is:
N_freq={1, 0, 101, 0}
N_freq={1, 1, 0, 101, 0, 100}

Note that two new calls e5 and e6 have frequencies 0 and 100, respectively. As explained before, e5 and e6 are not added into the call graph and used merely as internal data to the GIA and updatingFrequency algorithms.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A computer controlled method for improving runtime performance of a source program by a compiler, said method comprising:
   (a) analyzing said source program comprising procedures to generate a call graph of said source program, wherein each of said procedures has a first known execution frequency;

(b) using said call graph in conjunction with inlining plans by an inlining method to generate an inlined version of said source program wherein one or more selected call sites have been inlined;

(c) after generating an inlined version of said source program, generating an updated execution frequency for each of said procedures;

(d) using said updated execution frequency for each of said procedures to generate optimized executable code for said source program;

wherein said updated execution frequency is computed each time any of said call sites is determined to be in lined; and wherein said updated execution frequency of said procedures is determined by proportional adjustment, wherein the ratio between a procedure's frequency and its statement frequency remains unchanged.

2. The method of claim 1, wherein said inlining method further comprises using heuristics to calculate cost/benefit ratios for calls in said procedures of said source program to generate a ranking of said call sites.

3. The method of claim 2, wherein said inlining method further comprises using said ranking cost/benefit ratios to select calls in said procedures for inlining.

4. The method of claim 3, wherein said selected calls are in lined until a predetermined resource limit has been reached, wherein said predetermined resource limit is part of said heuristic.

5. A computer controlled method of optimizing binary code of a source program which is compiled to run on a computer, said source program comprising procedures, said method comprising:

(a) providing a compiler system configured to accept said source program and to output binary code representing said source program which is capable of being processed on said computer architecture, said compiler system comprising a front end portion, a code optimizer portion and a back end code generator;

(b) providing said code optimizer portion of said compiler system configured to accept intermediate code from said front end portion of said compiler system and to analyze said source program comprising procedures to generate a call graph of said source program wherein each of said procedures has a first known execution frequency;

(c) using said call graph in conjunction with inlining plans by an inlining method in said code optimizer to generate an inlined version of said source program, wherein one or more selected call sites have been inlined;

(d) after generating an inlined version of said source program, using said code optimizer to generate an updated execution frequency for said procedures;

(e) using said code optimizer to generate an intermediate optimized code version of said source program by processing said inlined source program with said updated execution frequency for each of said selected call sites;

(f) providing said intermediate optimized code to a back-end code generator to generate optimized binary code for said source program;

wherein said updated execution frequency is computed each time any of said call sites is determined to be inlined; and wherein said updated execution frequency of said procedures is determined by proportional adjustment, wherein the ratio between a procedure's frequency and its statement frequency remains unchanqed.

6. The method of claim 5, wherein said inlining method further comprises using heuristics to calculate cost/benefit ratios for calls in said procedures of said source program to generate a ranking of said call sites.

7. The method of claim 6, wherein said inlining method further comprises using said ranking cost/benefit ratios to select calls in said procedures for inlining.

8. The method of claim 7, wherein said selected calls are inlined until a predetermined resource limit has been reached, wherein said predetermined resource limit is part of said heuristic.

9. A computer system, comprising:

central processing unit (CPU);

random access memory (RAM) coupled to said CPU, for use in compiling a source program to run on said computer system, said source program comprising procedures;

a compiler system resident in said computer system, said compiler system comprising:

a front end compiler operable to generate intermediate code for said source program, a code optimizer operable to:

(a) accept intermediate code from said front end portion of said compiler system and to analyze said source program to generate a call graph of said source program wherein each of said procedures has a first known execution frequency;

(b) process said call graph in conjunction with inlining plans by an inlining method to generate an inlined version of said source program wherein one or more selected call sites have been inlined;

(c) after generating an inlined version of said source program, generate an updated execution frequency for each of said procedures;

(d) generate an intermediate optimized code version of said source program by processing said inlined source program with said updated execution frequency for each of said procedures;

(e) provide said intermediate optimized code to a back-end code generator; and wherein said back-end code generator is operable to generate optimized binary code for said source program for execution by said central processing unit;

wherein said updated execution frequency is computed each time any of said call sites is determined to be inlined; and wherein said updated execution frequency of said procedures is determined by proportional adjustment, wherein the ratio between a procedure's frequency and its statement frequency remains unchanqed.

10. The computer system of claim 9, wherein said inlining method further comprises using heuristics to calculate cost/benefit ratios for calls in said procedures of said source program to generate a ranking of said call sites.

11. The computer system of claim 10, wherein said inlining method further comprises using said ranking cost/benefit ratios to select calls in said procedures for miming.

12. The computer system of claim 11, wherein said selected calls are inlined until a predetermined resource limit has been reached, wherein said predetermined resource limit is part of said heuristic.

* * * * *